July 28, 1931. E. W. MORTER 1,815,984
EAR TRIMMING DEVICE
Filed June 29, 1928 2 Sheets-Sheet 1
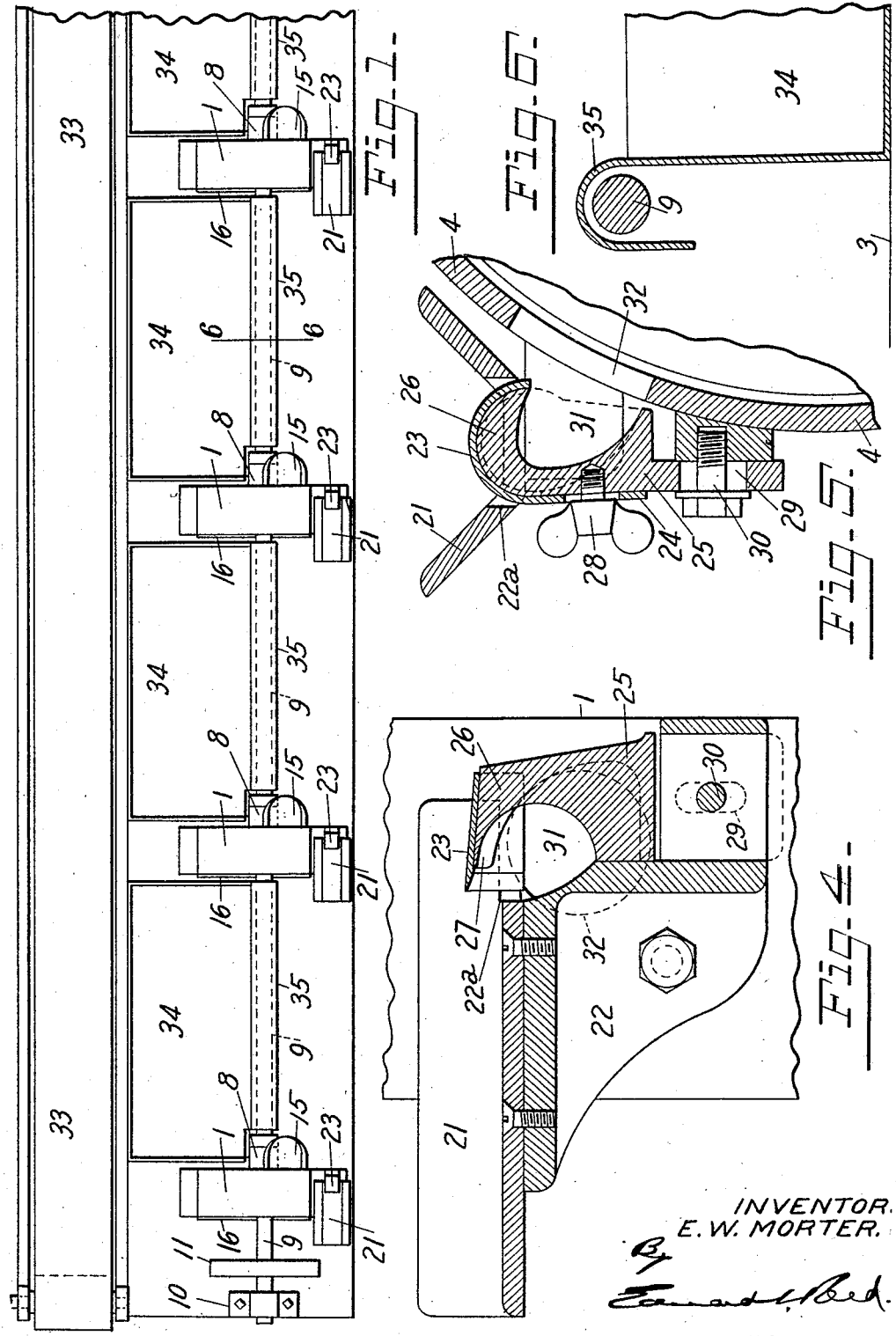
INVENTOR.
E. W. MORTER.
ATTORNEY.

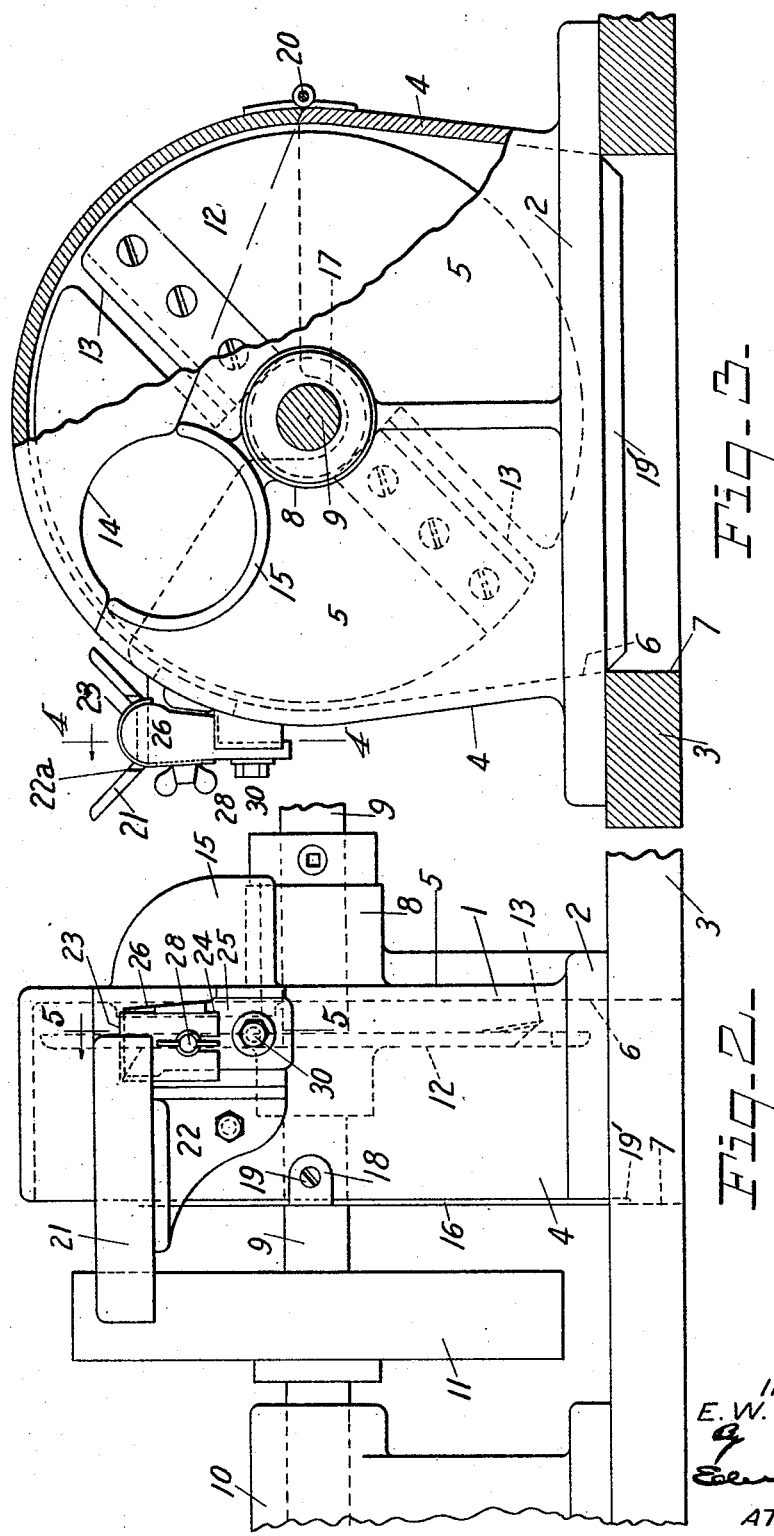

Patented July 28, 1931

1,815,984

UNITED STATES PATENT OFFICE

EARL W. MORTER, OF WASHINGTON COURTHOUSE, OHIO

EAR TRIMMING DEVICE

Application filed June 29, 1928. Serial No. 289,286.

This invention relates to ear trimming devices and is designed more particularly for trimming ears of green corn.

In corn canning factories the green corn is butted, husked and silked by machines and the husked ears are then delivered to a cutting machine which removes the grains of corn from the cobs. Before passing to the cutting machine the ears are examined by an inspector who removes any which contain objectional matter, such as an unfilled tip or a portion of the butt which was not removed, or worm runs. A worm usually works on an ear of corn between two rows of grains and by removing those portions of the two rows on which the worm has worked all objectionable matter may be removed, but when worm runs are removed by hand it is customary merely to slice down the side of the ear, thus removing a considerable quantity of good corn, this being done because of the amount of time required to trim out the two affected grain rows by hand.

One object of the present invention is to provide a trimming device which will operate to quickly remove all objectionable matter from an ear of corn.

A further object of the invention is to provide an ear trimming device of such a character that the cuttings and juices from the ear will be confined and not permitted to splash over the operator or the supporting table.

A further object of the invention is to provide a device for removing the worm runs which will remove only those portions of the two rows which are affected by the worm.

A further object of the invention is to so mount such a worm run removing device that the cuttings therefrom will be delivered into the main housing and discharged therefrom along with the cuttings from the main cutter.

Other objects of the invention will appear as the device is described in detail.

In the accompanying drawings Fig. 1 is a plan view of an installation embodying a series of ear trimming devices embodying the invention; Fig. 2 is a front elevation of an ear trimming device embodying the invention; Fig. 3 is an end elevation of the device of Fig. 2, partly broken away; Fig. 4 is a section taken through the worm run remover on the line 4—4 of Fig. 3; Fig. 5 is a transverse section taken on the line 5—5 of Fig. 2; and Fig. 6 is a section taken on the line 6—6 of Fig. 1.

In these drawings I have illustrated one embodiment of my invention but it will be understood that this particular embodiment has been chosen for the purpose of illustration only and that the mechanism may take various forms and may be arranged in various ways without department from the spirit of the invention.

In that form here shown, the trimmer comprises a housing 1 carried by a base 2 adapted to be mounted on a supporting structure or table 3. The housing may take various forms and it is here shown as having a substantially semi-circular upper portion and as comprising an edge or peripheral wall 4 and an end wall 5. The base 2 does not extend within the peripheral wall so that the bottom of the housing is provided with an opening 6 which registers with an opening 7 in the supporting structure.

The end wall 5 is provided with a bearing 8 in which is journaled a shaft 9. This shaft extends through the housing and beyond the opposite side thereof and may be supported in a second bearing 10, or in any other suitable manner, and may be connected with any suitable source of power for driving the same. In the present instance it is provided with a belt wheel 11. Rigidly secured to the shaft 9 within the housing is a cutter which, in the present instance, consists of a disk 12 having two radial blades 13 arranged to travel in a plane close to but slightly spaced from the inner surface of the end wall 5 of the housing. This end wall has an ear receiving opening 14 through which an ear may be inserted and the end thereof brought into engagement with the cutter. Preferably the end wall is provided about the opening 14 with an outwardly extending ear support 15 to facilitate supporting and guiding of the ear, the end of which is being trimmed. The cuttings which are removed from the ear by the cutter will drop downwardly through the openings 6 and 7 to a suitable receptacle, conveyor or the like. Rigidly secured to that side of the housing opposite the end wall 5 is a closure plate 16 which extends somewhat above the horizontal center of the housing and is recessed as shown at 17, to receive the shaft 9. Lugs 18 extend from the closure plate about the edge of the peripheral wall 4 of the housing and are rigidly secured thereto by screws 19. The lower edge of the closure plate extends below the base 2 and into the opening 7 in the supporting structure, as shown at 19', thus effectually closing the lower portion of the housing and preventing the escape of cuttings or juices from the ear. The upper portion of the housing, comprising portions both of the end wall 5 and the peripheral wall 4, is formed separate from the lower portion of the housing and hinged thereto, as shown at 20, thus constituting a movable closure by means of which access may be readily had to the interior of the housing.

Rigidly mounted on the housing is a device for removing those grain rows which have been affected by a worm run. As here shown, this device comprises a trough-like guide 21 carried by a bracket 22 rigidly secured to the housing. The bottom of this guide is cut away near the rear end thereof, as shown at 22a, to provide an opening through which extends a cutter or blade 23 to engage and remove the grain rows. This blade is preferably curved or so shaped that the central portion will extend above the bottom of the guide and will engage and remove only the affected rows of grain. In the present instance, the blade is substantially semi-circular in cross section and is provided with a downwardly extending portion 24 by means of which it is secured to a supporting member 25. As here shown, the supporting member comprises an upper part 26 shaped to fit within the blade 23 and having its forward portion tapered toward the cutting edge of the blade. The blade may be secured to the supporting member in any suitable manner, as by means of a thumb screw 28 extending through the lower portion of the blade and into the supporting member. The supporting member is preferably adjustably mounted on the housing so that it may be adjusted with relation to the guide 21 to accommodate it to grains of different sizes. To this end the lower portion of the supporting member is slotted, as shown at 29, and is secured to the housing by means of a screw 30. The supporting member is so shaped as to form a passageway 31 which extends from the cutting edge of the blade to an opening 32 formed in the peripheral wall 4 of the housing. In operation an ear is placed in the guideway 21 with the worm run downward and is then drawn rearwardly over the blade 23, which will remove the two rows of grains which have been affected by the worm run but will remove little if any of the adjacent grain rows. The cuttings removed from the ear drop through the passageway 31 in the supporting member, through the opening in the wall of the housing and are discharged from the housing through the outlet in the bottom thereof.

In Figs. 1 I have shown an installation embodying a series of trimmers. As there shown, the supporting structure or table 3 is of considerable length and has mounted thereon a series of trimmers, the housings of which are shown at 1; these trimmers being spaced apart far enough to permit of their convenient operation. A single shaft 9 extends through the housings of all the trimmers and carries all of the rotatable cutters. Consequently it is unnecessary to provide additional bearings for the shaft except at the driving end thereof, and the cost of manufacture, installation and operation are materially reduced. Extending along the rear side of the table is a conveyor 33 by means of which the husked ears are conveyed toward the cutting machine and the inspectors stand along the rear side of the conveyor to examine the ears and remove the defective ones, the defective ears, or those requiring trimming, being tossed into bins 34 supported on a structure or table 3. These bins are arranged between the rear portions of adjacent trimmers so that the operator standing in front of the trimmer can easily reach the ears in the bin. Each bin has its front wall, that is, the wall adjacent to the shaft 9, bent upon itself about a longitudinal axis, as shown at 35, and extending about that portion of the shaft lying between the adjacent trimmers and thereby forming a guard for that shaft.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an ear trimming device for green corn, a housing comprising a peripheral wall and an end wall and having an outlet in the lower portion thereof, said peripheral wall having an opening leading to said outlet, said end wall having a bearing, and an ear receiving opening, a shaft journaled in said bearing, a cutter mounted on said shaft to rotate adjacent to said ear receiving opening, and a device mounted on said housing, having means to remove selected rows of grains from an ear of corn and having a discharge passageway for the removed grains communicating with the opening in the peripheral wall of said housing.

2. In an ear trimming device for green corn comprising a housing and a cutter mounted within said housing, said housing having an opening to permit an ear of corn to be brought into contact with said cutter and having a discharge opening, a grain row removing device mounted on said housing and comprising a guide to support an ear of corn for lengthwise movement, a cutter shaped to remove predetermined rows of grain when lengthwise movement is imparted to said ear, and a passageway leading from said cutter and communicating with the discharge opening of said housing.

3. In an ear trimming device for green corn, a housing comprising a peripheral wall and an end wall, a cutter mounted within said housing, said end wall having an opening through which an ear of corn may be moved into engagement with said cutter and said peripheral wall having an opening therethrough, a guide mounted on said housing to support an ear of corn for lengthwise movement and having an opening in the bottom thereof, a blade having a curved portion extending through the opening in said guide, and a supporting member for said blade secured to said housing and having a passageway leading from said blade to said opening in the peripheral wall of said housing.

4. In an ear trimming device for green corn, a housing comprising a peripheral wall and an end wall, a cutter mounted within said housing, said end wall having an opening through which an ear of corn may be moved into engagement with said cutter and said peripheral wall having an opening therethrough, a guide mounted on said housing to support an ear of corn for lengthwise movement and having an opening in the bottom thereof, a blade having a curved portion extending through the opening in said guide, a supporting member for said blade secured to said housing and having a passageway leading from said blade to said opening in the peripheral wall of said housing, and means for adjustably mounting said supporting member with relation to said guide, whereby said blade may be caused to extend different distances above said guide.

5. In a mechanism of the character described, a supporting structure, a series of housings mounted on said structure and spaced one from the other, a shaft journaled in the several housings, cutters mounted on said shaft within the respective housings, means to drive said shaft, and bins supported by said structure between the respective housings, each of said bins having the upper portion of that wall thereof adjacent to said shaft bent about a longitudinal axis and extending about said shaft to form a guard therefor.

6. In an ear trimming device for green corn, a guide to support an ear of corn for lengthwise movement and a cutter supported adjacent to and projecting above the bottom of said guide, said cutter having a transverse upper portion to extend between separated rows of grain and remove the row or rows of grain between said separated rows, and means for securing said cutter in adjusted positions with relation to said guide.

7. In a corn trimming device for green corn, a guide to support an ear of corn for endwise movement and having an opening through the bottom thereof, a blade extending through said opening and having a portion curved upwardly about a relatively short radius and so arranged with relation to the bottom of said guide that it will remove selected grain rows when an ear of corn is moved lengthwise of said guide.

8. In an ear trimming device for green corn, a guide to support an ear of corn for lengthwise movement and having an opening through the bottom thereof, a supporting member extending through said opening, a blade rigidly secured to said supporting member and having a portion curved upwardly about a relatively short radius and so arranged with relation to the bottom of said guide that it will remove selected grain rows when an ear of corn is moved lengthwise of said guide.

9. In an ear trimming device for green corn, a guide to support an ear of corn for lengthwise movement and having an opening through the bottom thereof, a supporting member extending through said opening, a blade rigidly secured to said supporting member and having a portion curved upwardly about a relatively short radius and so arranged with relation to the bottom of said guide that it will remove selected grain rows when an ear of corn is moved lengthwise of said guide, said supporting member being shaped to form a passageway through which the removed grains may be discharged.

In testimony whereof I affix my signature hereto.

EARL W. MORTER.